(12) United States Patent
Itagaki et al.

(10) Patent No.: US 8,400,897 B2
(45) Date of Patent: Mar. 19, 2013

(54) MIGRATING DATA FROM ONE RECORDING MEDIUM TO ANOTHER

(75) Inventors: Hiroshi Itagaki, Yokohama (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/325,644

(22) Filed: Dec. 14, 2011

(65) Prior Publication Data

US 2012/0163150 A1 Jun. 28, 2012

(30) Foreign Application Priority Data

Dec. 24, 2010 (JP) ................................. 2010-288346

(51) Int. Cl.
*G11B 7/00* (2006.01)
(52) U.S. Cl. ........................................................ 369/84
(58) Field of Classification Search .................... 369/84, 369/85, 53.22; 711/161, 162, 111, 113, 112, 711/114
See application file for complete search history.

(56) References Cited

U.S. PATENT DOCUMENTS 7,644,242 B2 * 1/2010 Asano et al. .................. 711/161

FOREIGN PATENT DOCUMENTS

JP 2002-216458 8/2002

* cited by examiner

*Primary Examiner* — Nabil Hindi
(74) *Attorney, Agent, or Firm* — Stephen J. Walder, Jr.; Randall J. Bluestone

(57) ABSTRACT

Provided is a storage mechanism that readably migrates a content of data from one recording medium to another over generations in a readable manner and provides the contents of the records from a current recording medium. A read/write controller comprises a mechanism for preparing an archive recording medium of a first generation having a plurality of records recorded therein and a mechanism for migrating the records from the recording medium of the first generation to a recording medium of the next generation (the third generation subsequent to the first generation) and further to recording media of following generations one by one. The migration mechanism generates migration information including a mapping table between record numbers of the first generation and a current generation and holds the migration information as data in the recording medium of the current generation.

20 Claims, 4 Drawing Sheets

Figure 4

ITEM EXAMPLE OF RECORDING MEDIA MIGRATION INFORMATION (MIGRATION INFORMATION) IN MIGRATION FROM RECORDING MEDIUM A TO B OR C

- ● IDENTIFIER OF RECORDING MEDIUM A

- MANUFACTURER NAME OF RECORDING MEDIUM: e.g., ABC
  - TYPE OF RECORDING MEDIUM: e.g., 1ST-GENERATION MEDIUM, 3RD-GENERATION ENTERPRISE MEDIUM
  - SERIAL NUMBER OF RECORDING MEDIUM: e.g., MANUFACTURE NUMBER
  - BARCODE LABEL OF RECORDING MEDIUM: e.g., USER-DESIGNATED NUMBER IN SINGLE LIBRARY

- ● DATA IDENTIFICATION NUMBER MAPPING TABLE: RECORD RANGE MAPPED

- NUMBER 0 TO 10000 IN RECORDING MEDIUM A → NUMBER 10000 TO 20000 IN RECORDING MEDIUM B
  - NUMBER 0 TO 10000 IN RECORDING MEDIUM A → NUMBER 30000 TO 40000 IN RECORDING MEDIUM C

MIGRATING DATA FROM ONE RECORDING MEDIUM TO ANOTHER

BACKGROUND

The present invention relates to a mechanism for migrating data (record) contents from one recording medium to another over generations in a readable manner, and providing the data contents from a current recording medium.

Data stored in a storage device is required to be readable in long-term archiving over ten years or longer. An example of a typical tape drive for archiving data includes a Linear Tape-Open (LTO) tape drive, the IBM enterprise tape drive TS1130, and the like. Further, even after hardware such as a recording medium or a device for storing data is changed to a new one, the stored data needs to he readable from a current medium by being migrated to the current medium.

Migration between recording media is an unavoidable problem in archiving data in a storage system. The migration can roughly be divided into two categories. One is migration explicitly performed by an application having recorded data in the storage system. In the migration explicitly performed by an application having recorded data in a storage system, a server on which the application operates bears a large load. The other category is migration (serverless migration) performed irrespective of an application having recorded data in the storage system. The serverless migration is preferable in that the data recording application does not require a migration function and load on the server can be distributed.

Steps 1 to 3 below show a basic flow of the serverless migration:
1. An application X (a general application using a storage system) stores data in a recording medium A.
2. An application Y (an application dedicatedly performing migration) monitors states (a use period, a frequency of a recoverable error, and the like) of the recording medium A. When determining that the life of the recording medium A will reach an end of its lifespan soon, the application Y migrates data stored in the recording medium A to a recording medium B and then discards the recording medium A. The application Y stores correspondence (recording media migration information) between the recording media A and B in a database (DB) or the like.
3. When the application X requests access to the recording medium A, virtualization is performed to allow the application X to access the desired information in the recording medium B on the basis of recording media migration information stored in the DB, or the like, in Step 2. The migration is naturally performed multiple times depending on the storage periods of data in the recording media.

In a migration process in long-term archiving, the data stored by the application X migrates from recording media A to D through media B and C. Recording media before and after migration do not necessarily have a one-to-one relationship. Data stored in multiple first-generation recording media may be migrated to a single next- or current-generation recording medium. In addition, data stored in a single recording medium may be divided and recorded in multiple recording media or recorded in multiple recording media in an overlapping manner.

One of problems of the present serverless migration is that recording media migration information stored in a DB or the like might be lost. In such a case, even though target data is present in the recording medium B, there is no way to know that the data that has been recorded in the recording medium A by the application X is already migrated to the recording medium B. The problem is that the application X consequently cannot access the target data.

For example, Japanese Patent Application Publication No. 2002-216458 describes a mechanism in which disk management information is stored in a recording medium, and the recording medium is managed based on the management information. The mechanism described in Japanese Patent Application Publication No. 2002-216458, however, provides no description of any mechanism for holding and utilizing meta information in data migration. When a database including migration information is lost in a conventional system environment in which data is read from an archive medium, it is laborious to rebuild the archive data readable environment.

SUMMARY

An object of the present invention is to provide a method, a storage device, and a recording medium for migrating data contents from one recording medium to another over generations in a readable manner, and providing the data contents from a current recording medium.

The present invention achieves the aforementioned object by providing a storage device that migrates contents of records from one recording medium to another over generations in a readable manner and provides the contents of the records from a current recording medium. The storage device comprises a read/write controller that includes a mechanism for preparing an archive recording medium of a first generation having a plurality of records recorded therein, and a mechanism for migrating (copying) the records from the recording medium of the first generation to a recording medium of the next generation (the third generation subsequent to the first generation) and further to recording media of following generations one by one. The migration mechanism further generates migration information including a mapping table between record numbers of the first generation and a current generation, and holds the migration information as data in the recording medium of the current generation.

In the storage device, in reading the contents of the records from the current recording medium, the migration mechanism causes a read application of the first generation, or an intermediate generation, to read the migration information held in the current recording medium, and to read the records in reference to the mapping table between record numbers.

In the storage device, the migration information is stored in a dataset in a current recording medium. In the storage device, the dataset is a housekeeping dataset.

In the storage device, the migration information includes mapping between a range of record numbers in the recording medium of the first generation and a range of record numbers in a recording medium of the intermediate generation or the current generation. In the storage device, the migration information further includes a generation, a name of a manufacturer, and a serial number of the recording medium of the first generation or the intermediate generation.

Moreover, the present invention achieves the aforementioned object by providing a recording medium for holding records having contents migrated from one recording medium to another over generations in a readable manner. An archive recording medium of a first generation having a plurality of records recorded therein is prepared. The records are migrated from the recording medium of the first generation to a recording medium of the next generation and further to recording media of following generations. Migration information, including a mapping table between record numbers of the first generation and a current generation, is further generated and the migration information is held as data in a recording medium of the next generation.

The recording medium comprises migration information having the mapping table between record numbers, the migration information being read by a read application of the first generation or an intermediate generation to enable the plurality of records to be read, when a host or a tape drive reads the contents of the records from the recording medium. In the recording medium, the migration information is stored in at least one dataset.

Furthermore, the present invention achieves the aforementioned object by providing a method for readably migrating contents of records from one recording medium to another over generations in a readable manner and provides the contents of the records from a current recording medium. The method comprises preparing an archive recording medium of a first generation having a plurality of records recorded therein and migrating (copying) the records from the recording medium of the first generation to a recording medium of the next generation (the third generation subsequent to the first generation) and further to recording media of following generations one by one. The migration further generates migration information including a mapping table between record numbers of the first generation and a current generation and holds the migration information as data in the recording medium of the current generation.

In the method for providing the contents of the records from a current recording medium, in reading the contents of the records from the current recording medium, the migration causes a read application of the first generation or an intermediate generation to read the migration information held in the current recording medium, and to read the records in reference to the mapping table between record numbers. The present invention described above is usable for recovery in the case of damage or loss of a migration information database.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 shows a table divided into a recording media identifier and a mapping table between data identification numbers of recording media in accordance with one illustrative embodiment.

DETAILED DESCRIPTION

Hereinafter, an illustrative embodiment of the present invention will be described for a mechanism for readably migrating data contents in recording media over generations. The illustrative embodiment is provided for an illustrative purpose and does not limit how the present invention may be implemented. Many modifications to the illustrative embodiment may be made without departing from the spirit and scope of the present invention.

In the present invention, recording media migration information is stored in a data-migrated recording medium, and thus the presence of the data-migrated recording medium is all that is needed to perform data migration. When copying data stored in a certain recording medium A to another recording medium B, an application holds recording media migration information on the recording medium B. Thus, even if the recording media migration information stored in a DB or the like is lost, an application having stored data in a storage system can access the data which is migrated to a recording medium without the application's knowledge that the recording media migration information was lost.

Figure 1:
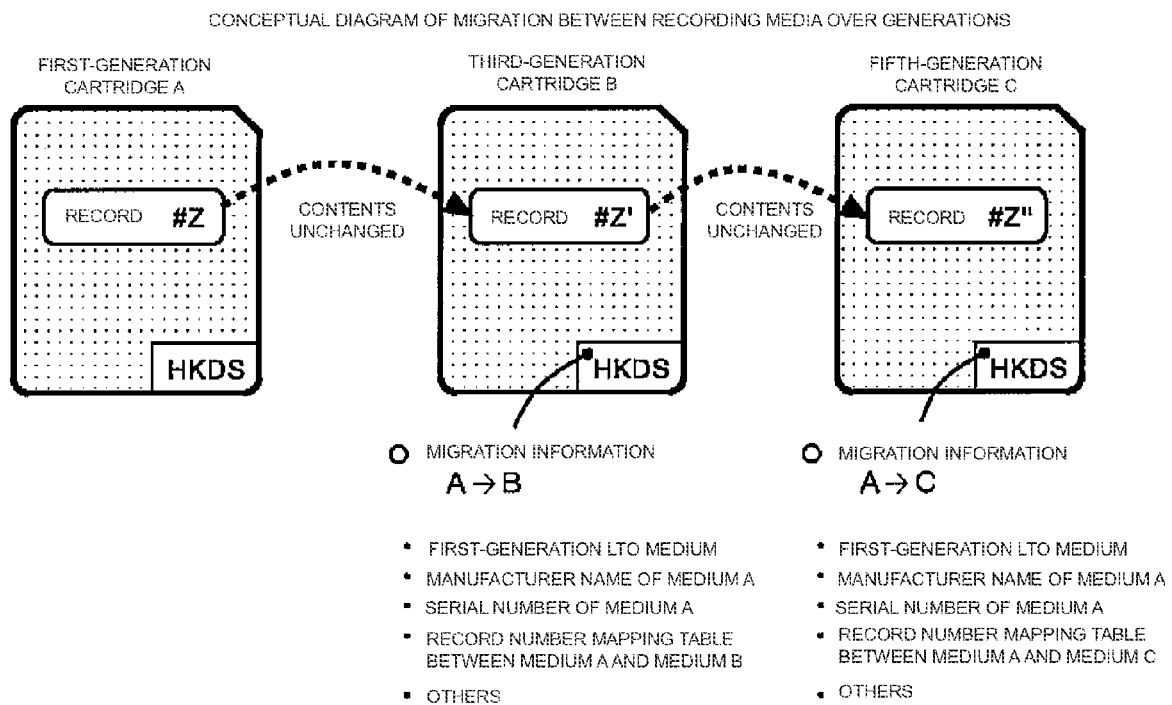
FIG. 1 shows an overview of data migration between recording media over multiple generations in accordance with one illustrative embodiment.

FIG. 1 shows an overview of data migration between recording media over multiple generations in accordance with one illustrative embodiment. Data is copied from a first-generation cartridge (or other type of recording media) A to a next-generation cartridge (or other type of media) to ensure the data archive. FIG. 1 shows that the data is migrated to a third-generation cartridge through a second-generation cartridge. Each recording medium (cartridge) itself holds migration information including a correspondence relationship of record numbers and the like so that the archive data can be read even though a recording medium of any generation for reading and writing archive data is changed. A tape cartridge may store attribute information to be used in a special dataset (House Keeping Data Set) aside from a dataset in which a user record is recorded. The migration information held in the recording medium (a tape cartridge) will be described in detail later with reference to FIG. 4. What is necessary is to know correspondence between the record numbers in the first-generation medium and the record numbers in the current-(second- or third-) generation medium. The tape drive can read target data by reading the migration information from the data-migrated recording medium in response to a read request from an application X of a host.

Since the recording density increases in the recording media (tape cartridges) of the first, third, and fifth generations as the generation becomes younger, the total number of fixed-length datasets in the medium depends on the generation. Data (e.g., a record) designated by the application X of a user (e.g., the host) has a variable length. Thus, the total numbers of data pieces (e.g., records) included in the recording media of different generations are different from each other. With later generations of media, the record numbers are also handled in a different manner from that in the first-generation (original-generation) recording medium. Over years, hardware configured to manage archives, and a system therefor, might be replaced with other ones, and a database (DB) including migration information managed by a server might be lost. The present invention makes it possible to secure a correspondence relationship of record numbers in a data-migrated recording medium between an older-generation recording medium and the migration-destination-generation recording medium after execution of the migration. That is, this is achieved by identifying correspondence between an original record number and a data-migrated record number based on meta information of the (original) first-generation medium and meta information of the data-migrated medium.

Figure 2:
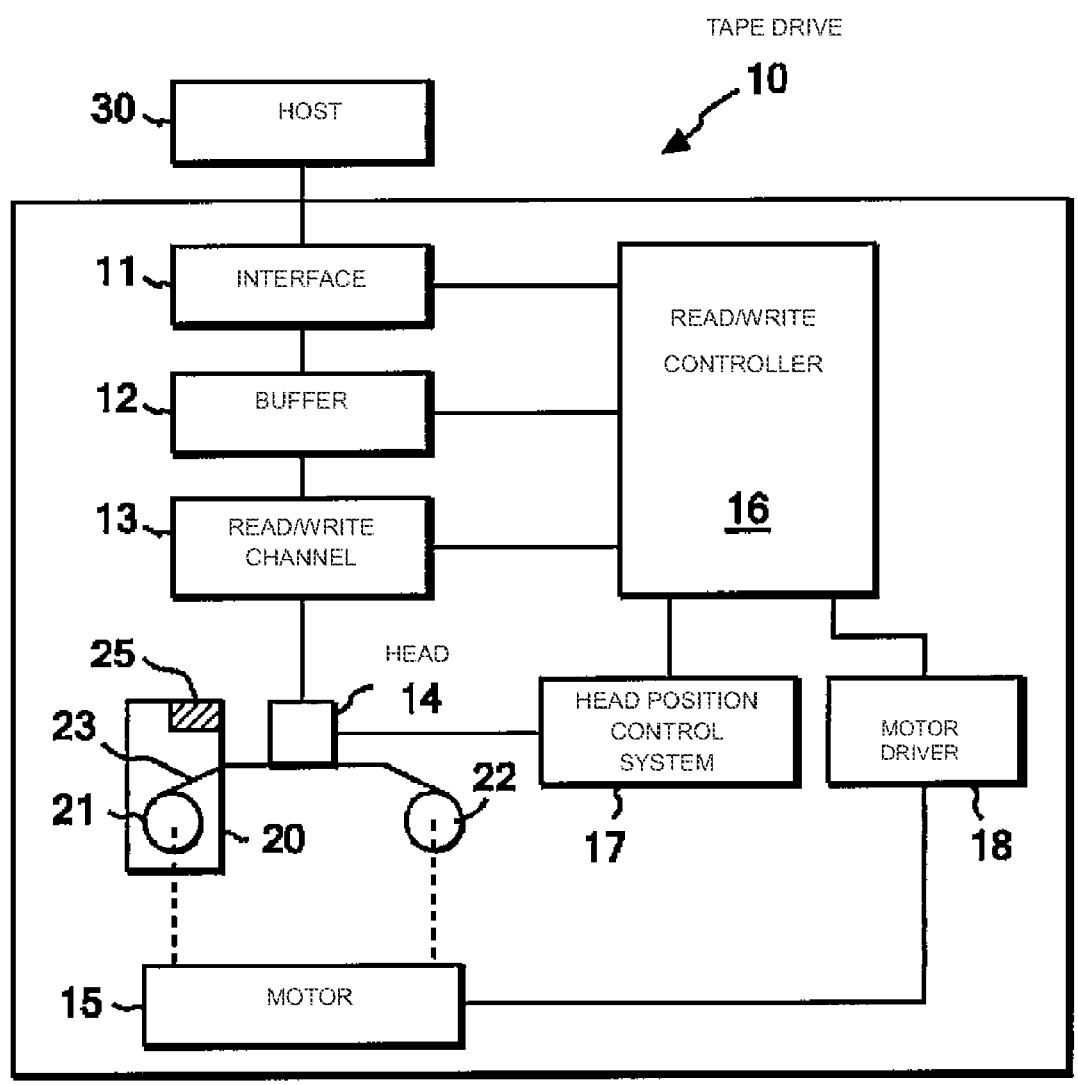
FIG. 2 shows a configuration example of a tape drive to which the mechanisms of the illustrative embodiment are applied.

FIG. 2 shows a configuration example of a tape drive 10 to which the mechanisms of the illustrative embodiment are applied. The tape drive 10 writes or overwrites multiple files or data (files) transmitted from a host 30 to a tape recording medium in units of a fixed-length dataset (DS). A fixed-length dataset (DS) is a group of multiple files and is a unit for writing data to a tape having a fixed-length-format structure. Note that the present invention does not exclude a case where the DS has a variable length, but a case where the DS has the fixed length will be described in the following embodiment for illustrative purposes.

The tape drive 10 includes an interface 11, a buffer 12, a channel 13, a head 14, a motor 15, and a reel 22 around which a tape 23 is wound. The tape drive 10 further includes a read/write controller 16, a head position control system 17, and a motor driver 18. Two motors may be provided as the motor 15. A tape cartridge 20 is attachably and detachably loaded on the tape drive 10.

The tape cartridge 20 includes the tape 23 wound around a reel 21. With the rotation of the reels 21, 22, the tape 23 is moved in a longitudinal direction thereof, from the reel 21 to the reel 22, or from the reel 22 to the reel 21. A tape medium other than a magnetic tape may be used as the tape 23. In order to move the tape 23 to a target position at a high speed in reading data, the tape drive 10 records tape cartridge attribute information (called a tape directory) in a non-volatile memory of a non-contact type called a cartridge memory (CM) 25 provided in the tape cartridge 20. Reading or writing from or to the CM 25, provided in the tape cartridge 20, is performed in a non-contact manner by the tape drive 10.

When the tape 23 moves in the longitudinal direction thereof, the head 14 writes and reads information to and from the tape 23. The motor 15 rotates the reels 21, 22. Although a single motor is shown as the motor 15, it is preferable to provide one motor for each of the reels 21, 22.

The read/write controller 16 controls the tape drive 10 on the whole. For example, the read/write controller 16 controls reading or writing data to or from the tape 23 in accordance with a command received by the interface 11. The read/write controller 16 also controls the head position control system 17 and the motor driver 18, adds a correction code to write data, and performs error correction on read data. The motor driver 18 drives the motor 15.

The interface 11 communicates with the host 30 which is an example of an upper-layer device. From the host 30, the interface 11 receives a command for moving the tape 23 to a target position, a command for writing data to the tape 23, and/or a command for reading data from the tape 23. These commands correspond to a positioning command, a Write command, and a Read command, respectively. Further, the interface 11 makes a response to the host 30 indicating whether processing in response to the corresponding command succeeds or fails. The host 30 designates the position of the variable-length data and the number of data pieces in a command and issues the command to the tape drive 10.

The buffer 12 is a memory in which data to be written to the tape 23, and data read from the tape 23, is accumulated. For example, the memory may comprise a DRAM or the like. In addition, the buffer 12 may comprise multiple fixed-length buffer segments, and each buffer segment may store therein a DS, which again is a unit of reading data from and writing data to the tape 23. A single DS may comprise a part of one of the data pieces transmitted from the host 30 or multiple data pieces transmitted from the host 30. Data passed on through the read/write channel 13 is written to the tape 23 by the head 14 in DS units (for example, 400 KB, 1.6 MB, or the like). A synchronization command is a command for writing data stored in a buffer, such as buffer 12, to a tape, such as tape 23.

Meanwhile, a table is generated at the serverless migration, the table storing the following information (migration information) in a data-migrated recording medium. The table is divided into a recording media identifier and a mapping table for mapping between the data identification numbers of recording media.

The migration information has a recording medium identifier that identifies the recording medium A (the recording medium in which the application stores the data). The following shows a preferable example of a recording medium identifier:

Manufacturer name of recording medium (e.g., IBM)
Type of recording medium (a product name or an ID for identifying a product not to assign the same serial number to consecutive serial numbers)(e.g., a first-generation LTO tape medium, a third-generation IBM Enterprise Tape medium, etc)
Serial number of recording medium
Barcode label of recording medium: A number used by a user for identifying a recording medium in a single library The migration information further has a mapping table between the data identification numbers of the recording medium A and a recording medium in which data is stored in the most recent migration. The mapping table between the data identification numbers may have a mapping of the numbers in a one-to-one basis. However, the numbers may be mapped in such a manner that a range of 0 to 10000 in the recording medium A is mapped to a range of 10000 to 2000, or 10000 to 20000, in a medium in which records are currently stored.

Meanwhile, when the serverless migration is executed, recording media migration information stored in a DB or the like might be lost for some reason. In accordance with the illustrative embodiments, even though the DB is lost, the recording media migration information can be rebuilt based on such information held by the data-migrated recording medium. As long as the data-migrated recording medium is usable, the application having recorded the data in a storage system can access data present on the data-migrated recording medium. The migration information may be written at a predetermined position of the recording medium or may be written at any position with a specific tag provided thereto, so that the migration information stored in the recording medium can he identified later.

The "serial number of a recording medium" is a number serially assigned to a recording medium by a manufacturer of the recording medium so as to discriminate one recording medium from the other. It is ensured that any recording medium of the same product type (for example, an IBM LTO fifth-generation cartridge) has a unique serial number. The "barcode label of a recording medium" is a number assigned by the user of a library so that a recording medium stored in the library can be discriminated from the other recording mediums. The user can select any number, and thus the number is not necessarily unique.

The barcode label is generally used for a user (a human being or a tape library) of a recording medium to discriminate the recording medium from the other recording mediums based on the barcode label without caring about the serial number. Thus, a barcode label having a unique number at least in a single library is expected to be assigned to the recording medium. The serial number is utilized by a developer to know the features of the product (for example, a manufacturing process thereof is slightly changed) from the serial number thereof. In the present invention, such a serial number may be linked to a library and a barcode label in the library, for example. The serial number and the barcode label can be utilized to identify a recording medium while an existing framework is utilized.

It is convenient to provide both the serial number and the barcode number under the circumstances as described above, but provision of both is not necessarily required. What is required is any information for discriminating the recording medium. The information may be a combination of "a manufacturer name, a product name, and a serial number" or a "barcode," depending on the particular implementation. In the former method of a combination of "a manufacturer name, a product name, and a serial number," the combination serves as a barcode label, such that a different recording medium is not used by mistake. However, without the barcode label or other discriminating information, it is difficult for an existing single tape library to discriminate the recording medium.

The latter method of use of only a barcode label may be an issue in a case where a recording medium extracted from a certain library is put into another library. Under an extremely limited condition that the number of the barcode label of the recording medium has been used for a different recording medium, the different recording medium might be used by mistake. On the other hand, as long as the barcode label is used in the current single library, the recording medium is discriminated based on the barcode label only, and thus the later method has better compatibility with the existing system. It is believed that a practical implementation example is a combined use of both the combination of "a manufacturer name, a product name, and a serial number" and "a barcode."

Note that migration performed over generations of recording media (cartridges) in a tape drive, for example, LTO 1, 2, 3, 4, . . . will be described as a typical example. However, migration between media of the present invention includes migration between different kinds of recording media. For example, the migration is performed between a hard disk drive (HDD), DVD, or CD and tape cartridges therefor of multiple generations, or between a hard disk drive (HDD), DVD, or CD and cartridges of multiple generations for an enterprise tape drive (IBM System Storage TSxxxx).

FIG. 1 shows an example of the migration performed between media over three generations. As an example of the following steps, an implementation example is taken in which data written in a first-generation LTO format is subjected to serverless migration to a tape recording medium in a fifth-generation LTO format via a tape recording medium in a third-generation LTO format.

1. An application X stores data in a tape recording medium A in the first-generation LTO format.

2. An application Y (an application dedicatedly performing migration) monitors the states of the tape recording medium A. When determining that the life of the tape recording medium A will reach the end of its lifespan soon, the application Y migrates data stored in the tape recording medium A to a tape recording medium B in the third-generation LTO format and then discards the tape recording medium A. The application Y stores correspondence (recording media migration information) between the tape recording media A and B is stored in a DB or the like. The application Y stores the successor information in an HKDS or a cartridge memory (CM) of the tape recording medium B.

The application Y holds the following migration information by a tape drive in the CM or the HKDS of the cartridge loaded thereon. A table including the migration information may be divided into recording media identifiers and a mapping table between the data identification numbers of the recording media. The mapping table between the data identification numbers includes information for converting a record number designated by the application X of the host into a record number in the current-generation medium, thereby allowing the application X to read data of the appropriate content of the record number. The "mapping table between the data identification numbers" is a mapping table between a record number in the tape recording medium A and a record number in the tape recording medium B. The mapping table is stored in the HKDS, the table being equivalent to mapping between a bit position on a recording medium in which the application X has stored data (that is, not on the second recent data-migrated recording medium but on the original recording medium) and a bit position on a data-migrated recording medium.

3. The application Y monitors the states of the tape recording medium B. When determining that the life of the tape recording medium B will reach the end of its lifespan soon, the application Y migrates data stored in the tape recording medium B to a tape recording medium C in the fifth-generation LTO format and then discards the tape recording medium B. The application Y stores correspondence (recording media migration information) between the tape recording medium A (not the recording medium B) and the tape recording medium C in the DB or the like. The application Y stores the successor information in an HKDS or a CM of the tape recording medium C or both thereof.

4. When receiving a request for accessing data corresponding to a record #Z stored in the tape recording medium A from the application X, the application Y discriminates which record # on the tape recording medium C corresponds to the record based on the migration information held by the tape recording medium C, and thereby can allow the application X to access record #Z', on the tape recording medium C, which has the same information as the record #Z stored in the tape recording medium A by the application X.

Figure 3:
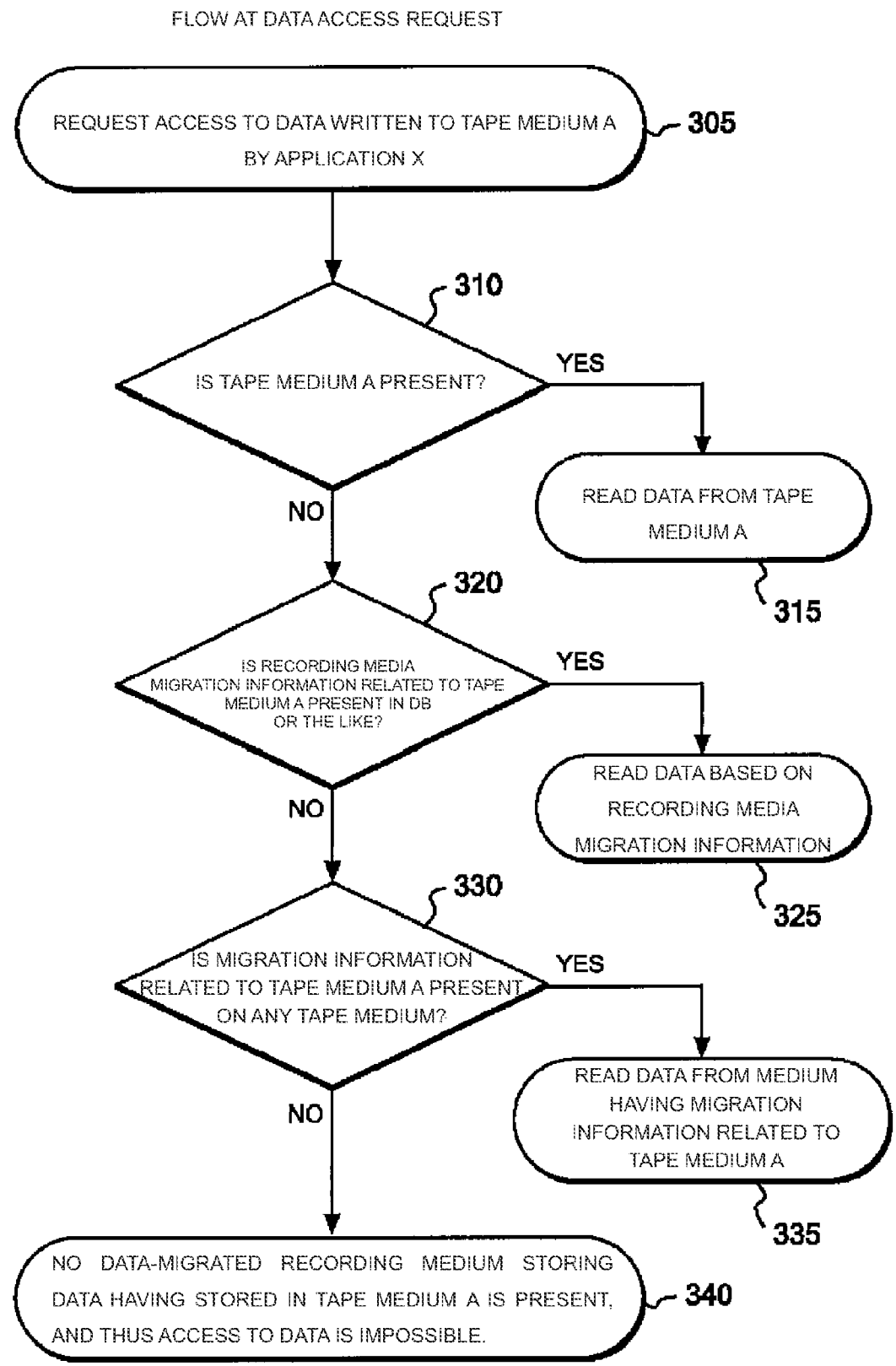
FIG. 3 shows a flowchart of processing performed in the tape drive in response to a data access request from a host in accordance with one illustrative embodiment.

The flowchart to be described below shows a flow at the time of the data access request. FIG. 3 shows a flowchart of processing performed in the tape drive in response to a data access request from a host in accordance with one illustrative embodiment. In the determination "Is migration information related to the recording medium A present on any tape recording medium?" in step 330, no migration information related to the tape recording medium A in which data is originally stored is present on any tape recording medium in the conventional technique. Such a determination cannot be made with the conventional technique. When a migration information DB is lost, access to the original tape recording medium A becomes impossible. With the present invention, however, the determination in step 330 can be made. When the migration information related to the tape recording medium A in which the data is originally stored is found on the tape recording media (B, C, . . . ), access to the original data is enabled.

FIG. 4 shows that a table, in accordance with one illustrative embodiment, is divided into a recording media identifier and a mapping table between data identification numbers of recording media.

Recording medium identifier:
  Type of tape recording medium A, e.g., first-generation LTO tape medium
  Manufacturer name of tape recording medium A
  Serial number of tape recording medium A
  Barcode label of tape recording medium A
  mapping table between data identification numbers of recording media:
  Mapping table between record number of tape recording medium A and record number of tape recording medium C This is equivalent to the aforementioned "mapping between a bit position on a recording medium in which the application X stores data (that is, not on the second recent data-migrated recording medium but on the original recording medium) and a bit position on a data-migrated recording medium."

In some cases, the migration information only requires information on correspondence between a position at which data is stored in the most recent migration and a position at which data (records) is originally stored by the application X. In such cases, intermediate information of repeated migration is not required. The omission of the intermediate information can prevent the migration information from swelling after repeated migration. Data of the stored migration information including only the correspondence relationship between data (the ranges of record numbers) of the first and the last recording media may be set to Read Only. In order to read target data from the data-migrated medium, it is satisfactory to make the application X of the host for originally backing up the data believe as if the data were always present at the original storage position.

However, there is a case where migration information in migration between intermediate-generation media is stored, when data is migrated to the current recording medium over multiple intermediate generations. For example, a certain application X stores data in the tape recording medium A. Suppose a case where the data is migrated from the tape recording medium A to the tape recording medium B, and, after archiving the data therein, a different application Y directly accesses the tape recording medium B to store new data in a free storage space outside the record range in which the data in the tape recording medium A is migrated. In this case, it is conceivable that in reading the data in the tape recording medium A, the application Y takes the record range of migration of the data in the tape recording medium A as the record range of the data in the tape recording medium B.

It is also possible to hold, not only the positions at which the data is stored by the application X originally and after the most recent migration, but also a series of histories. Specifically, it is conceivable that the table including the migration information has also histories of intermediate migration information as follows.

Media identifier of recoding medium A (recording medium in which application stores data)
Media identifier of recoding medium B (data-migrated recording medium of recording medium A)
Media identifier of recoding medium C (data-migrated recording medium of recording medium B)
Media identifier of recoding medium Z (data-migrated recording medium of recording medium Y)
Mapping table between data identification numbers of recording medium A and recording medium B
Mapping table between data identification numbers of recording medium B and recording medium C
Mapping table between data identification numbers of recording medium Y and recording medium Z As described above, the present invention is usable for recovery in damage of the migration information DB and is effective in that load on the memory controller is decreased and that a total required memory access time can be reduced. Further, only data storage position after the most recent migration is required as information, and intermediate information on repeated migration is not required, and thus migration information is prevented from swelling.

The invention claimed is:

1. A storage device that migrates contents of records from one recording medium to another over generations of recording media in a readable manner and provides the contents of the records from a current recording medium, the storage device comprising:
 a read/write controller; and
 a data read/write device coupled to the read/write controller, the data read/write device being configured to read and/or write data from/to a recording medium, wherein the read/write controller is configured to:
 prepare an archive recording medium having a first generation configuration, and having a plurality of records recorded therein; and
 migrate the records from the archive recording medium of the first generation to a current recording medium having a different second generation configuration, wherein the read/write controller, when migrating the records, further is configured to generate migration information including a mapping table having mapping data to map between record numbers of the archive recording medium having the first generation configuration and record numbers of a current recording medium having the second generation configuration, and wherein the current recording medium stores the migration information as data in the current recording medium.

2. The storage device according to claim 1, wherein in reading contents of the records from the current recording medium, the read/write controller causes a read application of the first generation or an intermediate generation to read the migration information stored in the current recording medium, and to read the records in reference to the mapping table between record numbers in the migration information read from the current recording medium.

3. The storage device according to claim 1, wherein the migration information is stored in a dataset in the current recording medium.

4. The storage device according to claim 3, wherein the dataset is a housekeeping dataset.

5. The storage device according to claim 4, wherein the migration information includes data for mapping between a range of record numbers in the archive recording medium having the first generation configuration and a range of record numbers in the current generation having the second generation configuration different from the first generation configuration.

6. The storage device according to claim 5, wherein the migration information further includes a generation, a name of a manufacturer, and a serial number of the archive recording medium having the first generation configuration.

7. A recording medium for holding records having contents migrated from one recording medium to another over generations of recording media, in a readable manner, comprising:
 a records storage portion that stores the records having migrated contents; and
 a migration information storage portion that stores migration information, wherein:
 the records having contents are migrated from an archive recording medium having a first generation configuration,
 the migration information includes a mapping table comprising data for mapping between record numbers of the first generation configuration and record numbers of a current generation configuration used by the recording medium, different from the first generation configuration.

8. The recording medium according to claim 7, wherein, in response to a reading of the records in the records storage portion by an application of the first generation configuration, the migration information is also read by the application and used by the application to enable accessing the records read from the records storage portion using the mapping table.

9. The recording medium according to claim 7, wherein the migration information is stored in at least one dataset.

10. A method for readably migrating contents of records from one recording medium to another over generations in a readable manner and provides the contents of the records from a current recording medium, the method comprising the steps of:
preparing an archive recording medium having a first generation configuration, and having a plurality of records recorded therein; and
migrating the records from the archive recording medium of the first generation to a current recording medium having a different second generation configuration, wherein migrating the records further comprises:
generating migration information including a mapping table having mapping data to map between record numbers of the archive recording medium having the first generation configuration and record numbers of a current recording medium having the second generation configuration; and
storing the migration information as data in the current recording medium.

11. The method for providing the contents of the records from a current recording medium, according to claim 10, wherein, in reading the contents of the records from the current recording medium, a read application of the first generation also reads the migration information stored in the current recording medium, and reads the records using the mapping table to map between record numbers of the archive recording medium and record numbers of the current recording medium.

12. The method according to claim 10, wherein the migration information is stored in a dataset in the current recording medium.

13. The method according to claim 12, wherein the dataset is a housekeeping dataset.

14. The method according to claim 13, wherein the migration information includes data for mapping between a range of record numbers in the archive recording medium having the first generation configuration and a range of record numbers in the current generation having the second generation configuration different from the first generation configuration.

15. The method according to claim 14, wherein the migration information further includes a generation, a name of a manufacturer, and a serial number of the archive recording medium having the first generation configuration.

16. The storage device according to claim 1, wherein the archive recording medium is a first electromagnetic tape recording medium and the current recording medium is a second electromagnetic tape recording medium different from the first electromagnetic tape recording medium.

17. The storage device according to claim 1, wherein the second generation configuration is a later developed generation configuration from the first generation configuration.

18. The method according to claim 10, wherein the archive recording medium is a first electromagnetic tape recording medium and the current recording medium is a second electromagnetic tape recording medium different from the first electromagnetic tape recording medium.

19. The method according to claim 10, wherein the second generation configuration is a later developed generation configuration from the first generation configuration.

20. The method according to claim 10, wherein migrating the records from the archive recording medium of the first generation to a current recording medium having a different second generation configuration comprises migrating the records from the archive recording medium to an intermediate recording medium having a third generation configuration different from the first generation configuration and second generation configuration.

* * * * *